US012806794B2

(12) United States Patent
Graham et al.

(10) Patent No.: US 12,806,794 B2
(45) Date of Patent: Nov. 24, 2026

(54) RECIPROCATING MOTION INSERTION TOOL

(71) Applicant: General Electric Company, Schenectady, NY (US)

(72) Inventors: Andrew Crispin Graham, Badminton (GB); Lokaditya Ryali, Guilderland, NY (US); Deepak Trivedi, Halfmoon, NY (US); Chang Liu, Ho-Ho-Kus, NJ (US); Grover Andrew Bennett, Jr., Esperance, NY (US); Younkoo Jeong, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 189 days.

(21) Appl. No.: 18/639,403

(22) Filed: Apr. 18, 2024

(65) Prior Publication Data

US 2025/0326134 A1 Oct. 23, 2025

(51) Int. Cl.
*A61B 17/295* (2006.01)
*B25J 11/00* (2006.01)

(52) U.S. Cl.
CPC .................................. *B25J 11/0065* (2013.01)

(58) Field of Classification Search
CPC ........... A61B 17/295; A61B 17/320016; B25J 11/0065
See application file for complete search history.

(56) References Cited

U.S. PATENT DOCUMENTS

| | | | |
|---|---|---|---|
| 2,783,794 | A | 3/1957 | Kroll |
| 4,227,584 | A | 10/1980 | Driver |
| 4,483,562 | A | 11/1984 | Schoolman |
| 4,751,821 | A | 6/1988 | Birchard |
| 5,304,012 | A | 4/1994 | Wendling |
| 5,349,940 | A | 9/1994 | Takahashi |
| 5,378,234 | A | 1/1995 | Hammerslag |
| 5,816,923 | A | 10/1998 | Milo |
| 7,033,979 | B2 | 4/2006 | Herwig |
| 7,097,539 | B2 | 8/2006 | Moeller |
| 7,154,362 | B2 | 12/2006 | Ohnstein |
| 7,171,279 | B2 | 1/2007 | Buckingham |

(Continued)

FOREIGN PATENT DOCUMENTS

| | | |
|---|---|---|
| CA | 2738266 | 10/2012 |
| CN | 102832751 | 12/2012 |

(Continued)

OTHER PUBLICATIONS

U.S. Appl. No. 18/735,776, filed Jun. 6, 2024, entitled "Rigidizable Insertion Tool With Pneumatically Driven End Effector".

(Continued)

*Primary Examiner* — Cortez M Cook
(74) *Attorney, Agent, or Firm* — Fitch, Even, Tabin & Flannery LLP

(57) ABSTRACT

A reciprocating motion insertion tool include a flexible section, an end effector actuator, a connector within the flexible section and coupled to the end effector actuator, and an end effector coupled to a distal end of the flexible section, wherein the end effector is configured to move in a reciprocating motion at a select reciprocation rate when driven by the end effector actuator.

19 Claims, 14 Drawing Sheets

(56) References Cited

U.S. PATENT DOCUMENTS

| | | | | |
|---|---|---|---|---|
| 8,028,936 | B2 | 10/2011 | Mcdermott | |
| 8,100,031 | B2 | 1/2012 | Zubiate | |
| 8,277,647 | B2 | 10/2012 | Rice | |
| 8,347,754 | B1 | 1/2013 | Veltri | |
| 8,844,646 | B2 | 9/2014 | Lu | |
| 9,138,782 | B2 | 9/2015 | Dorshimer | |
| 9,739,168 | B2 | 8/2017 | Ekanayake | |
| 9,907,620 | B2 | 3/2018 | Shelton, IV | |
| 9,926,517 | B2 | 3/2018 | Tibbetts | |
| 9,932,854 | B1 | 4/2018 | Tibbetts | |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,227,891 | B2 | 3/2019 | Eriksen | |
| 10,323,539 | B2 | 6/2019 | Bewlay | |
| 10,377,968 | B2 | 8/2019 | Brooks | |
| 10,385,723 | B2 | 8/2019 | Flynn | |
| 10,634,004 | B2 | 4/2020 | Giljohann | |
| 10,669,885 | B2 | 6/2020 | Pecchiol | |
| 10,920,181 | B2 | 2/2021 | Martin | |
| 11,027,317 | B2 | 6/2021 | Tibbetts | |
| 11,389,179 | B2 | 7/2022 | Bono | |
| 11,441,446 | B2 | 9/2022 | Rawson | |
| 11,613,003 | B2 | 3/2023 | Graham | |
| 11,692,650 | B2 | 7/2023 | Graham | |
| 11,752,622 | B2 | 9/2023 | Graham | |
| 2006/0089531 | A1 | 4/2006 | Tartaglia | |
| 2007/0142849 | A1 | 6/2007 | Ewers | |
| 2009/0183887 | A1 | 7/2009 | Baber | |
| 2012/0160050 | A1 | 6/2012 | Nishio | |
| 2013/0267950 | A1* | 10/2013 | Rosa | A61B 17/320016 606/45 |
| 2015/0159122 | A1 | 6/2015 | Tibbetts | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2017/0297156 | A1 | 10/2017 | Kell | |
| 2018/0117731 | A1 | 5/2018 | Fielding | |
| 2018/0149038 | A1 | 5/2018 | Eriksen | |
| 2018/0155060 | A1 | 6/2018 | Dauenhauer | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0153890 | A1 | 5/2019 | Eriksen | |
| 2019/0270187 | A1 | 9/2019 | Chiang | |
| 2019/0323378 | A1 | 10/2019 | Tibbetts | |
| 2019/0383158 | A1 | 12/2019 | Diwinsky | |
| 2020/0107898 | A1* | 4/2020 | Kim | A61B 17/295 |
| 2020/0114528 | A1 | 4/2020 | Graham | |
| 2021/0052336 | A1 | 2/2021 | Mampetta | |
| 2021/0108537 | A1 | 4/2021 | Rigg | |
| 2021/0138252 | A1 | 5/2021 | Eby | |
| 2021/0317752 | A1 | 10/2021 | Deja | |
| 2021/0388737 | A1 | 12/2021 | Foxall | |
| 2022/0221706 | A1 | 7/2022 | Trivedi | |
| 2025/0339974 | A1 | 11/2025 | Ryali | |
| 2025/0339975 | A1 | 11/2025 | Ryali | |

FOREIGN PATENT DOCUMENTS

| | | | |
|---|---|---|---|
| CN | 212360466 | U | 1/2021 |
| DE | 102013202616 | A1 | 8/2014 |
| DE | 102015006330 | | 11/2016 |
| JP | S5937043 | | 2/1984 |
| WO | 2020022474 | A1 | 1/2020 |
| WO | 2020030516 | A1 | 2/2020 |
| WO | 2024088782 | A1 | 5/2024 |

OTHER PUBLICATIONS

U.S. Appl. No. 18/735,791, filed Jun. 6, 2024, entitled "Rigidizable Insertion Tool With Rotary End Effector".

Flex shaft 304V: https://www.fwmetals.com/services/resource-library/304v/; Screen captures dated Jan. 24, 2024;2 pgs.

Flex shaft 35NLT—https://www.fwmetals.com/services/resource-library/35n-lt/#:~:text=35N%20LT%20is%20an%20excellent,stylets%2C%20catheters%20and%20orthopaedic%20cables; Screen captures dated Jan. 24, 2024;2 pgs.

Flexible Borescope Blending Tool On-Wing Reparatur an Triebwerken; Flexible Borescope Blending Tool Broschure; Scholly Excellence Inside; Nov. 1, 2019; 5 pgs.

Richard Wolf GmbH; Out Aerospace Tooling; https://www.richard-wolf.com/en/solutions/aeropace-applications/; 3pgs; webcapture dated Jan. 5, 2024.

Robert Bosch Tool Corporation; 9100-21 Fortiflex Heavy Duty Flex Shaft Tool Kit; https://www.dremel.com/us/en/p/9100-21-f0139100aa; 4 pgs.; webcapture dated Jan. 5, 2024.

* cited by examiner

Mechanical Impedance: $Z = \frac{F}{v} = j\omega M + C - \frac{jK}{\omega}$

Effective Tool Impedance: $Z_{eff} = \sum_{i=1}^{N_{rope}} Z_{rope} + \frac{1}{\sum_{i=1}^{N_{cell}} \frac{1}{Z_{cell}} + f(Z_{rope})}$ Unit Cells In Series Cell Assembly Stiffness Is A Function Of Rope Tension Ropes & Unit Cell Assembly In Parallel

FIG. 7A

RECIPROCATING MOTION INSERTION TOOL

FIELD OF THE DISCLOSURE

The present subject matter relates generally to an insertion tool, and more specifically an insertion tool for engine servicing.

BACKGROUND

Insertion tools have applications in various industries. The tools can be used for inspection, manufacturing, servicing, and the like. The effectiveness of these tools often depends on their ability to reach difficult areas. In aviation, insertion tools can be used to inspect, service, and/or repair assembled engines through annular openings.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

FIGS. 7A and 7B are equations and a graph depicting reciprocating rate selection in accordance with some embodiments of the present disclosure.

DETAILED DESCRIPTION

Figure 1:
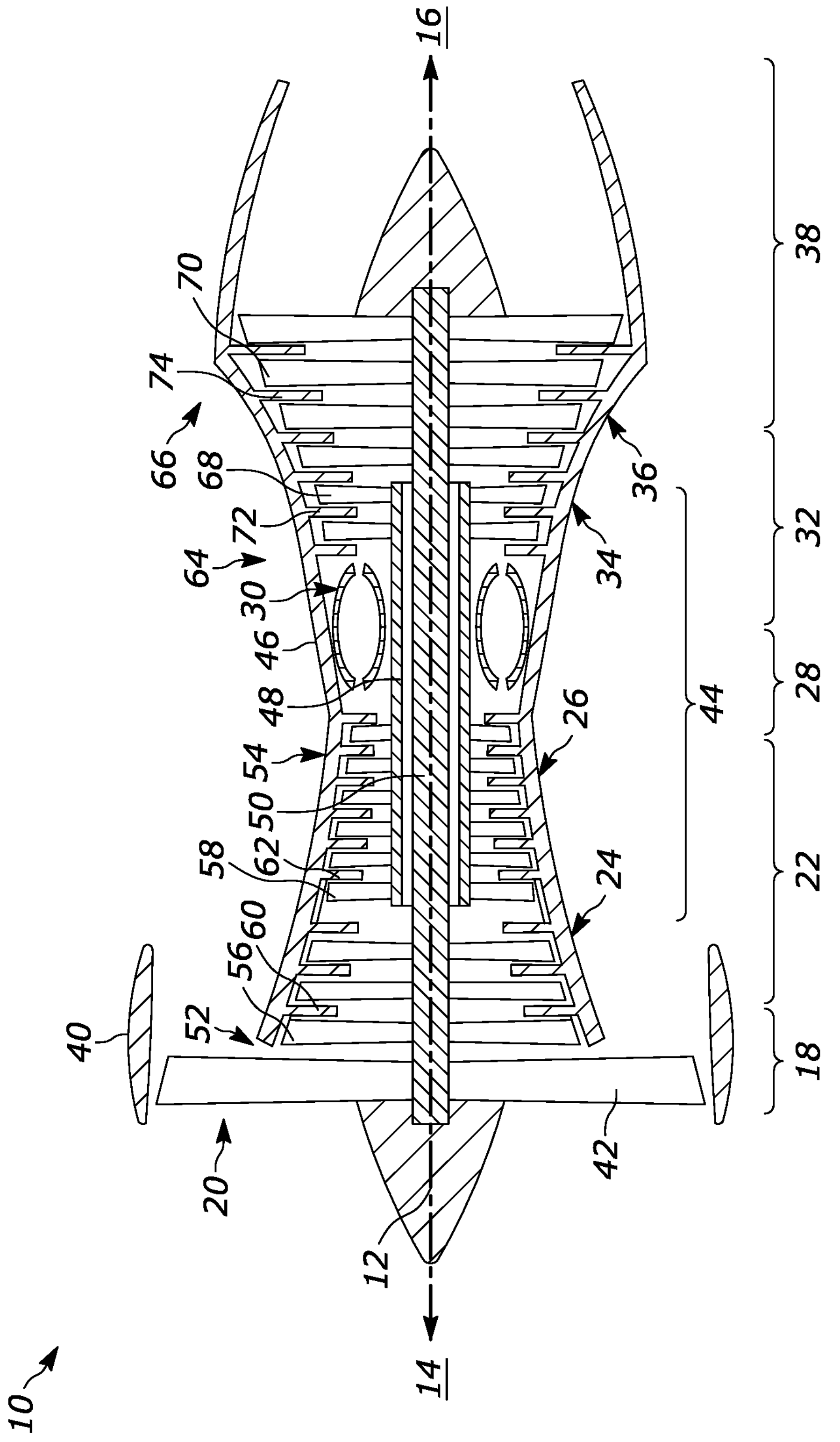
FIG. 1 is a cross-sectional schematic view of a high-bypass turbofan jet engine in accordance with some embodiments of the present disclosure.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Boreblending tools are a type of insertion tool that can be used to service or repair interior surfaces of a device such as a turbine engine. Boreblending tools can use continuous rotary motion to drive an end effector such as a grinding bit. When the end effector contacts a workpiece, a reaction force is experienced by the tool. The reaction force includes the normal contact reaction force and the resulting tangential friction reaction force. The normal reaction force may result in some deflection of the boreblending tool, but the deflection is likely to have only a small effect on the position of contact between the end effector and the workpiece. The tangential friction force, by contrast, can act to move the end effector along the workpiece, which may result in significant motion, creating difficulty in controlling the position of the end effector relative to the workpiece. This is likely to be particularly impactful in grinding operations which involve periodic contact with and/or lift-off from the workpiece. The amount of end effector movement relative to the workpiece can be a function of the tool stiffness and the tangential grinding force.

An insertion tool with reciprocating motion is described herein. By driving the end effector to oscillate rapidly, instead of rotating continuously, the deflection of the tool becomes a function of both stiffness and inertia in the tool due to mechanical impedance, reducing the movement of the end effector point of contact with the workpiece. In some embodiments, the reciprocating motion may be implemented in boreblending using a snake-arm robot, finger snake, or rigidizable guide tool.

Referring now to the drawings, wherein identical numerals indicate the same elements throughout the figures.

FIG. 1 is a schematic cross-sectional diagram of a conventional gas turbine engine 10 for an aircraft in which a servicing, repair, and/or inspection system described herein can operate. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

An HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

It will be appreciated that the engine 10 may further define a plurality of openings allowing for inspection, servicing, and/or repair of various components within the engine 10 without disassembling or only partially disassembling the engine 10. For example, the engine 10 may define a plurality of insertion tool openings at various axial positions within the compressor section 22, combustion section 28, and turbine section 32. Additionally, the engine 10 may include one or more igniter ports within, e.g., the combustion section 28 of the engine 10, that may allow for inspection, servicing, and/or repair of the combustion section 28.

It should further be appreciated that the exemplary engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable turbine engine may be serviced, repaired, and/or inspected with the systems and methods described herein. For example, in other exemplary embodiments, the engine 10 may not be a turbofan engine, and instead may be configured as a turboshaft engine, a turboprop engine, turbojet engine, etc., or may be an industrial gas turbine engine for electricity generation, fluid pumping, etc. In some embodiments, the systems and methods described herein may be used for the servicing, repair, or inspection of other aircraft or vehicle components. In some embodiments, the systems and methods described herein may be used in the servicing and/or inspection of any type of devices susceptible to internal surface damage such as cracks, dents, scratches, corrosions, abrasions, oxidations, etc. that requires servicing and repairs.

Figure 2:
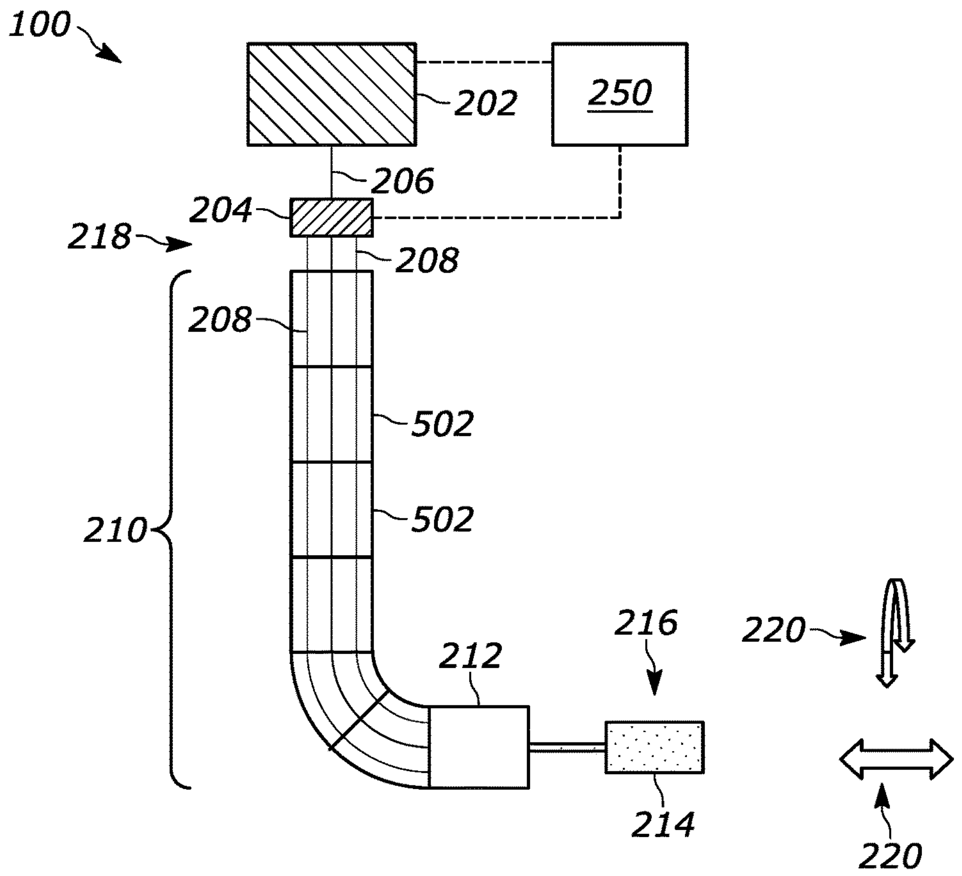
FIG. 2 is an insertion tool in accordance with some embodiments of the present disclosure.

FIG. 2 is an illustration of an insertion tool 100 according to some embodiments. The insertion tool 100 includes an end effector actuator 202, a connector 206, a flexible section 210, and an end effector 214. The insertion tool 100 may include an inspection, servicing, and/or repair tool configured to be inserted into a confined cavity to inspect, service, or repair a surface or component within the cavity. In some embodiments, the insertion tool 100 may be an engine inspection, servicing, and/or repair tool sized and shaped to be inserted into an engine (e.g., the engine 10 of FIG. 1) through a port and secured to the exterior of the engine to perform operations. In some embodiments, the insertion tool 100 may be manually operated and/or controlled by a process-based controller 250 such as a processor executing computer executable instructions stored on a memory storage device. As used herein, the end of the insertion tool 100 that couples the end effector 214 is referred to as the distal end 216 and the opposite end is referred to as the proximal end 218. Generally, the insertion tool 100 is inserted with the distal end 216 first, while at least a portion of the proximal end 218 may remain outside of the confined space during operations of the insertion tool 100 on a workpiece.

The flexible section 210 of the insertion tool 100 includes a flexible elongated structure that extends along the proximal end 218 and distal end 216 of the insertion tool 100. In some embodiments, the flexible section 210 may include a unitary or segmented flexible tube with one or more holes 211 (FIGS. 4A and 4B) running longitudinally through the axis of the flexible section 210. In some embodiments, the flexible section 210 is rigidizable from a relaxed state to a tensioned state via a rigidization actuator 204. In some embodiments, the flexible section 210 includes a plurality of rigidizable links 502 that include end features that engage with adjacent links to rigidize the flexible section 210 into a predefined shape when tension is applied via a tension assembly 208 actuated by the rigidization actuator 204. FIG. 5 illustrates an insertion tool 100 in a non-rigidized relaxed state in which the rigidizable links 502 are not engaged (e.g., spaced apart, touching, or touching but not tensioned). In this state, the links have some (one, two, or three) degrees of freedom relative to each other allowing the flexible section 210 to bend during the insertion of the engine insertion tool 100. Elements sharing the same reference number in FIGS. 2 and 5 are generally the same or similar parts, and descriptions of these parts are not repeated herein. Once the tool 100 is inserted into position, the tool 100 may be rigidized, from the relaxed state shown in FIG. 5 to the tensioned state shown in FIG. 2, to position the tip of the tool at the desired location and orientation to allow for inspection, servicing and/or repair of a part such as an engine component. When rigidized the rigidizable links 502 may define a complex geometry extending through a three-dimensional cartesian coordinate system. That is, the tool 100 may simultaneously extend in the X-, Y-, and Z-axis along its length from a proximal end 218 to a distal end 216. The particular shape of the tool 100 can be configured based on the shape of the environment within which the tool 100 is to be used.

Referring back to FIG. 2, in some embodiments, the rigidization actuator 204 may include the tension assembly 208 including one or more pull ropes configured to pull on one or more of the rigidizable links 502 to cause the tensioning of the flexible section 210. In some embodiments, the flexible section 210 includes one or more segments as described in U.S. Patent Application Publication US2022/0221706A1, titled "Insertion Tool," the entirety of which is incorporated herein by reference. In some embodiments, the flexible section 210 may include a rigidizable guide tube or a snake arm robot. In some embodiments, the rigidization actuator 204 may be a jamming mechanism, a layer jamming mechanism, electromagnetic stiffness tuning of magneto-rheological materials, electromagnetic stiffness tuning of electro-rheological fluids, stiffness modulation with phase change, or with stiffness modulation with pressurization.

The end effector 214 is coupled to the distal end 216 of the flexible section 210. In some embodiments, the end effector 214 may be coupled to a rigidizable link 502 at the distal end 216 of the flexible section 210, referred to as a tip link. An example of such coupling is described with reference to FIG. 6 herein. In some embodiments, the end effector 214 includes a grinding burr, a grinding disc, a grinding wheel, a grinding stone, a saw, a sanding bit, a filing bit, a buffing wheel, a lapping tool, and/or a needle peening tool. In some embodiments, the end effector 214 may be changeable via a coupler or a coupling link at the distal end 216 of the flexible section 210.

Figure 3:
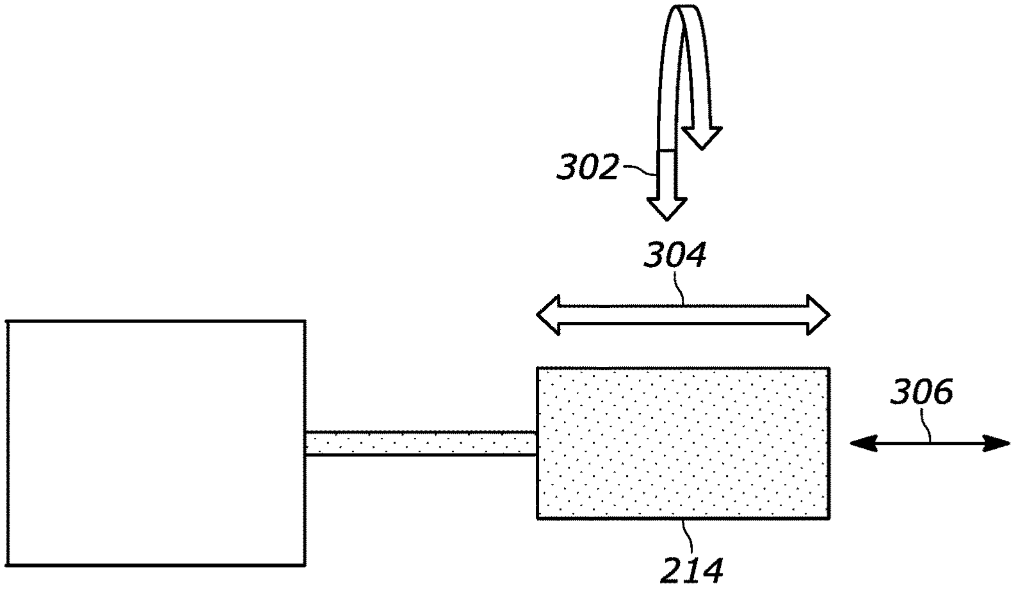
FIG. 3 is an insertion tool with axial and angular oscillation in accordance with some embodiments of the present disclosure.

The end effector 214 is driven by the end effector actuator 202 and drives the end effector 214 in a reciprocating motion 220 at a select reciprocation rate to perform an operation on a workpiece such as a surface within the assembled engine 10. Referring now to FIG. 3, in some embodiments, the reciprocating motion 220 of the end effector 214 includes angular oscillation 302 around an axis 306 of the end effector 214. In some embodiments, the reciprocating motion 220 of the end effector 214 may include axial oscillation 304 along the axis 306 of the end effector 214. In other embodiments, the reciprocating motion 220 of the end effector 214 includes lateral oscillation (e.g., in a direction perpendicular to the axial oscillation 304) of the end effector 214. In some embodiments the reciprocating motion 220 can be any combination of angular oscillation 302 and axial oscillation 304.

Referring back to FIG. 2, the end effector actuator 202 is configured to drive the end effector 214. In some embodiments, the effector actuator 202 supplies torque to the end effector 214 via electrical, mechanical, pneumatic, or hydraulic power. In some embodiments, the end effector actuator supplies reciprocating motion. In some embodiments, the end effector actuator 202 provides rotary or linear motion that is converted to reciprocating motion via a motion conversion mechanism 402 as described in further detail with reference to FIG. 4A in 4B. In some embodiments, the end effector 214 is driven at a select reciprocation rate of 10-10,000 Hertz, 50-8000 Hertz, or 50-5000 Hertz. The select reciprocation rate may be determined based on selecting a rate at least 10% greater, at least 20% greater, or at least 30% greater than the natural frequency of the insertion tool 100. As used herein, natural frequency refers to the frequency at which a freely vibrating system tends to oscillate. Natural vibrations are different from forced vibrations which happen at the frequency of an applied force (e.g., vibration caused by the actuation of the end effector 214). If the forced frequency is equal to the natural frequency, resonance occurs, and the vibrations' amplitude may increase manyfold. Further descriptions of reciprocation rate selection are provided with reference to FIGS. 7 and 8. In some embodiments, the reciprocating motion 220 has a range of motion between 5 microns to 10 millimeters (mm), between 0.2 mm to 15 mm, between 1 mm to 10 mm, between 10 microns to 2 mm, or between 50 microns to 1 mm.

In some embodiments, the end effector actuator 202 is located at the proximal end 218 of the tool 100 and may remain outside of the engine 10 during operation of the insertion tool 100. In some embodiments, the end effector actuator 202 may be positioned within the flexible section 210. In some embodiments, the end effector actuator 202 may provide rotary, linear, or reciprocating motion 220.

The end effector connector 206 is housed, at least partially, within the flexible section 210 and is coupled to the end effector actuator 202. The connector 206 may transmit electrical, mechanical, pneumatic, or hydraulic power from the proximal end 218 of the insertion tool 100 to the distal end 216. In some embodiments, the connector 206 is connected between the end effector actuator 202 and the end effector 214 and transmits motion from the end effector actuator 202 to the end effector 214 along the rigidizable links 502. In some embodiments, the end effector actuator 202 is positioned within the flexible section 210 or at a distal end 216 of the flexible section 210, and connector 206 provides power from the proximal end 218 of the insertion tool 100 to the end effector actuator 202. In some embodiments, the connector 206 may be a flexible cable, a flexible drive shaft, an electrical wire, and/or a fluid tube. In some embodiments, the connector 206 is inserted through one or more holes 211 (FIGS. 4A and 4B) within the flexible section 210 and is configured to bend with the flexible section 210 during insertion of the insertion tool 100.

In some embodiments, the insertion tool 100 optionally includes a vibration control mechanism 212 to limit the vibration of the flexible section 210 when the end effector 214 is driven to oscillate. Excessive vibration of the flexible section 210 can lead to misalignment of the tool 100, including shifting the position of the end effector 214 relative to the workpiece. Excessive vibration can also damage the tool 100 and/or parts of the device along the insertion path of the tool 100. As such, the inclusion of the vibration control mechanism 212 can reduce misalignment, damage, and wear during the operation of the insertion tool 100. In some embodiments, the vibration control mechanism 212 may be part of the end effector 214, coupled between the flexible section 210 and the end effector 214, or coupled to the proximal end 218 of the tool. In some embodiments, the vibration control mechanism 212 may include the rigidization actuator 204 described with reference to FIG. 2. For example, the rigidization actuator 204 may be used to modify the natural frequency of the flexible section 210 through tensioning to limit the vibration of the insertion tool 100. An embodiment of the vibration control mechanism 212 is described in further detail with reference to FIG. 6 herein.

Figure 4A:
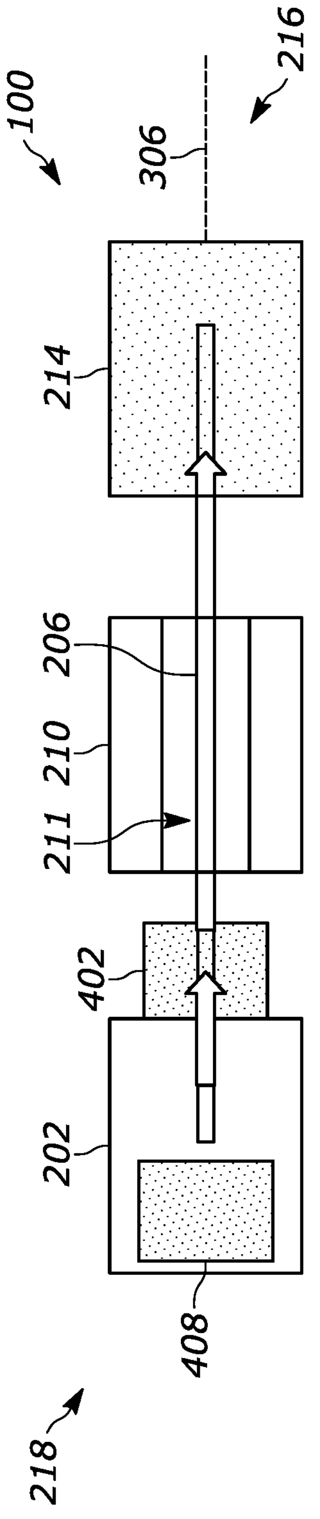
FIG. 4A is an insertion tool including a motion conversion mechanism in accordance with some embodiments of the present disclosure.
Figure 4B:
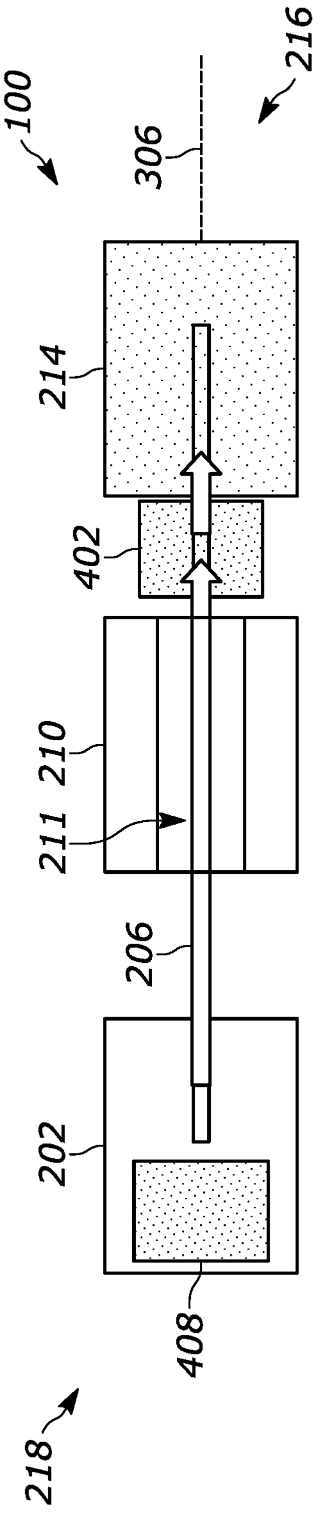
FIG. 4B is an insertion tool including a motion conversion mechanism in accordance with some embodiments of the present disclosure.
Figure 5:
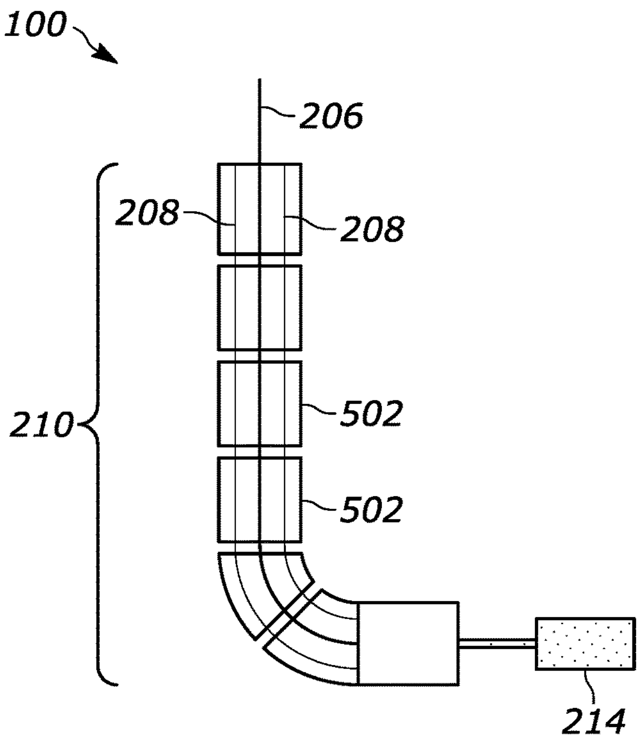
FIG. 5 is an insertion tool in a non-rigidized state in accordance with some embodiments of the present disclosure.

FIGS. 4A and 4B are illustrations of embodiments of an insertion tool 100 further including a motion conversion mechanism 402. Elements sharing the same reference number in FIGS. 2 and 4A-B are generally the same or similar parts, and descriptions of these parts are not repeated herein. In the embodiment shown in FIG. 4A, the end effector actuator 202 includes or is implemented by a motor 408. The motor 408 may provide rotary motion or linear motion. The motion conversion mechanism 402 converts the motion from the motor 408 into axial oscillation 304 (FIG. 3), angular oscillation 302 (FIG. 3), or a combination of axial oscillation 304 and angular oscillation 302. In the embodiment shown in FIG. 4A, the motion conversion mechanism 402 is located at the proximal end 218 near the motor 408. The connector 206 is inserted through the flexible section 210 to transmit torque from the motion conversion mechanism 402 to the end effector 214. The connector 206 may be a flexible cable or a flexible drive shaft, for example. In the embodiment shown in FIG. 4B, the motion conversion mechanism 402 is located at the distal end 216 of flexible section 210 and may be housed within the flexible section 210 and/or the end effector 214. The connector 206 is inserted through the flexible section 210 and transmits torque from the motor 408 to the distal end 216 of the motion conversion mechanism 402 which then drives the end effector 214. In some embodiments the motor 408 may provide rotary motion or linear motion. The motion conversion mechanism 402 converts the motion from the motor 408 into axial oscillation 304, angular oscillation 302, or a combination of axial oscillation 304 and angular oscillation 302.

Figure 9A:
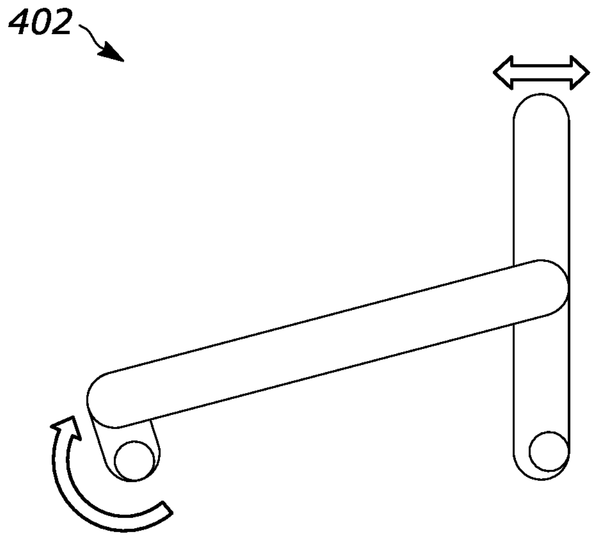
FIGS. 9A, 9B, 9C, 9D, 9E, and 9F are illustrations of devices that convert rotary motion to angular reciprocating motion in accordance with some embodiments of the present disclosure.
Figure 9B:
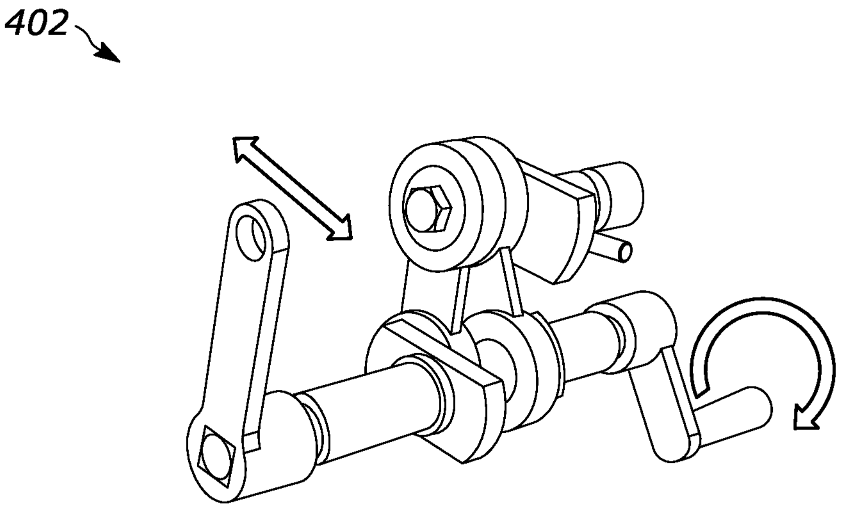
Figure 9C:
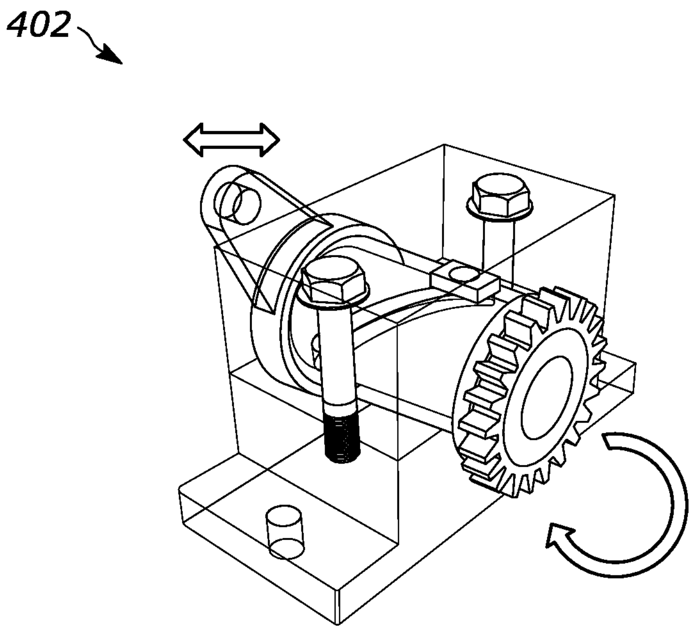
Figure 9D:
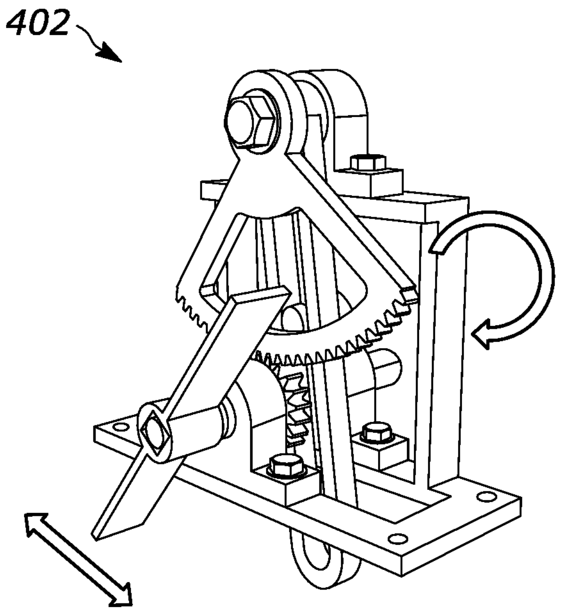
Figure 9E:
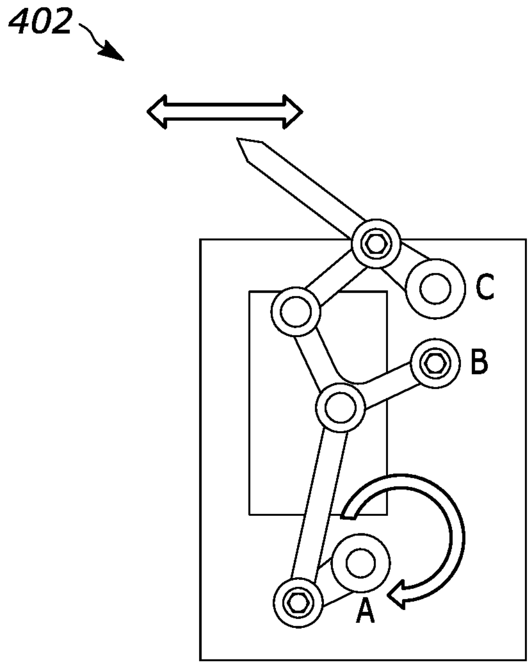
Figure 9F:
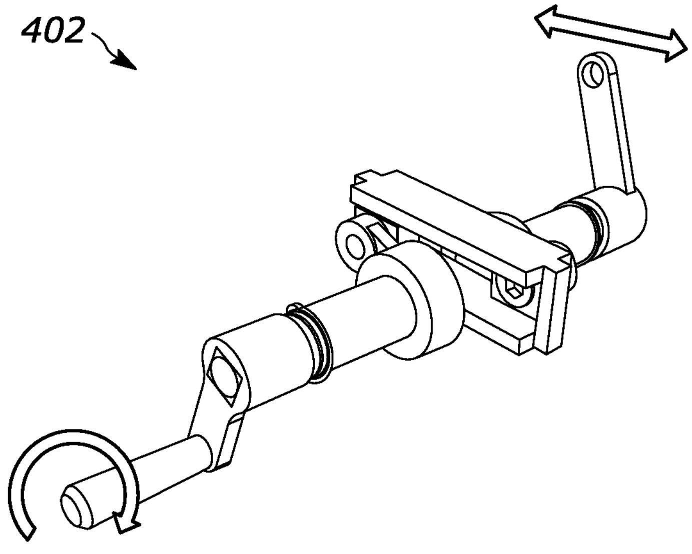

In some embodiments, the motor 408 may be a rotary motor, and the motion conversion mechanism 402 converts rotary motion into angular oscillation 302 (FIG. 3). A rotary motor may be an electrical motor, an air motor, a vane motor, a piston motor, a hydraulic motor, a gear pump, a twin-screw pump, or a rotary piezo motor. When converting rotary motion to angular oscillation 302, motion conversion mechanism 402 may include at least one of a four-bar linkage mechanism, a six-bar linkage mechanism, a crank-rocker mechanism, or a pin in a curved slot mechanism. Examples of rotary to angular oscillation motion conversion mechanisms are shown in FIGS. 9A-F. FIG. 9A illustrates a motion conversion mechanism with a crank cracker mechanism. FIG. 9B illustrates a motion conversion mechanism with connected parallelogram mechanism and four bar linkage. FIG. 9C illustrates an example of a pin in a slot mechanism with a barrel cam. FIG. 9D illustrates an example of a pin in a slot mechanism with a straight cam. FIG. 9E illustrates an example of a combination of two four-bar linkages. FIG. 9F illustrates an example of a combination of two sine mechanisms.

Figure 10A:
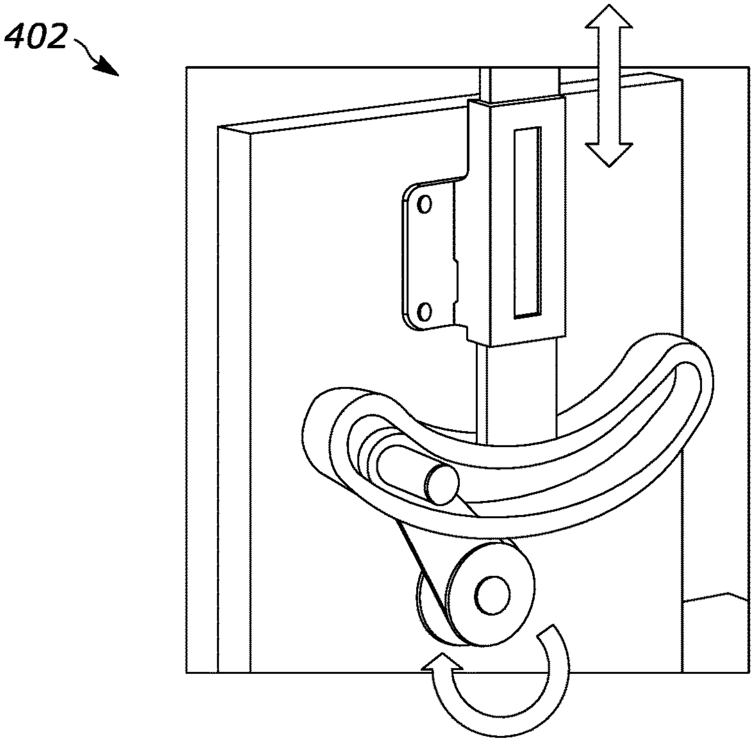
FIGS. 10A, 10B, 10C, 10D, 10E, 10F, and 10G are illustrations of devices that convert rotary motion to linear reciprocating motion in accordance with some embodiments of the present disclosure.
Figure 10B:
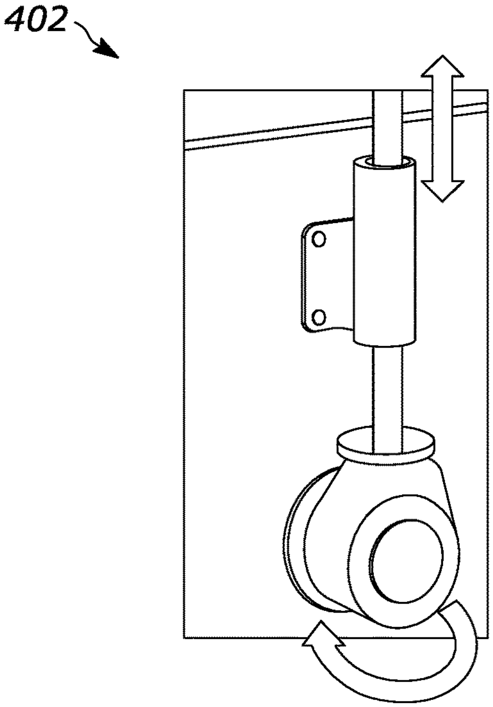
Figure 10C:
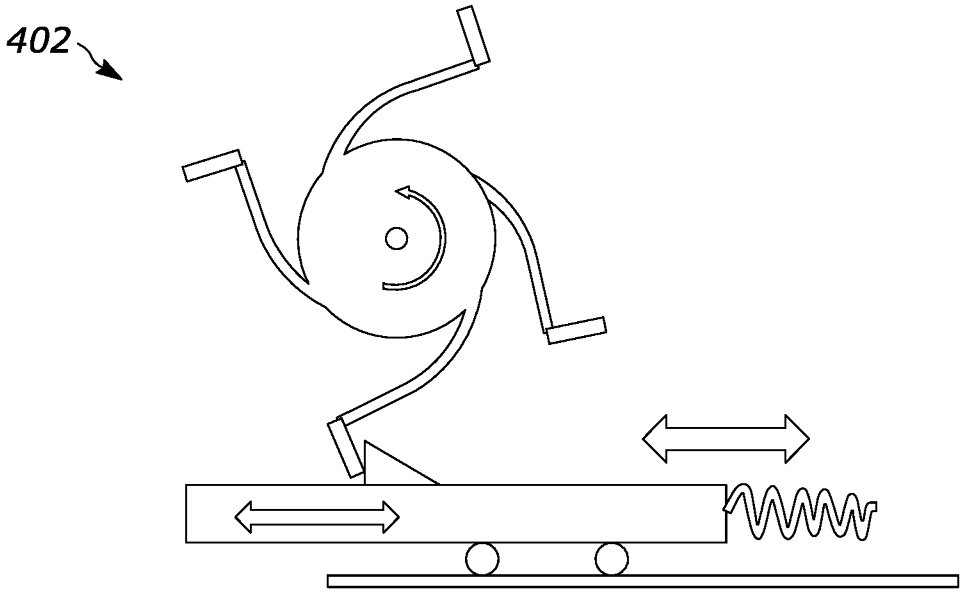
Figure 10D:
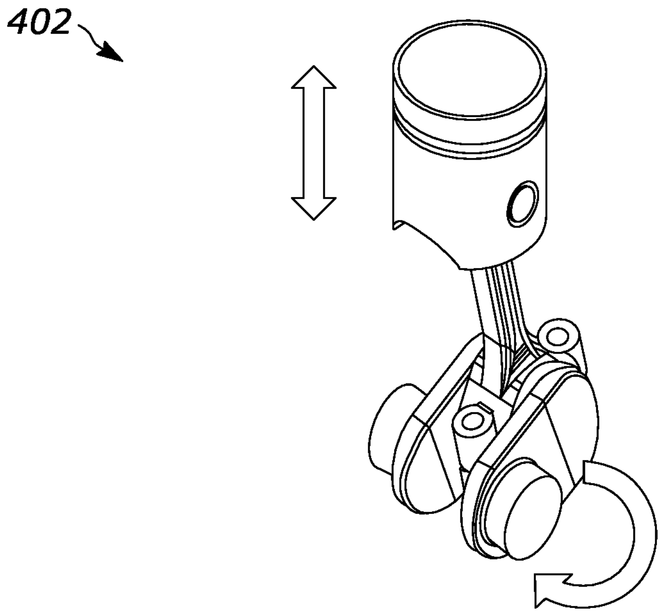
Figure 10E:
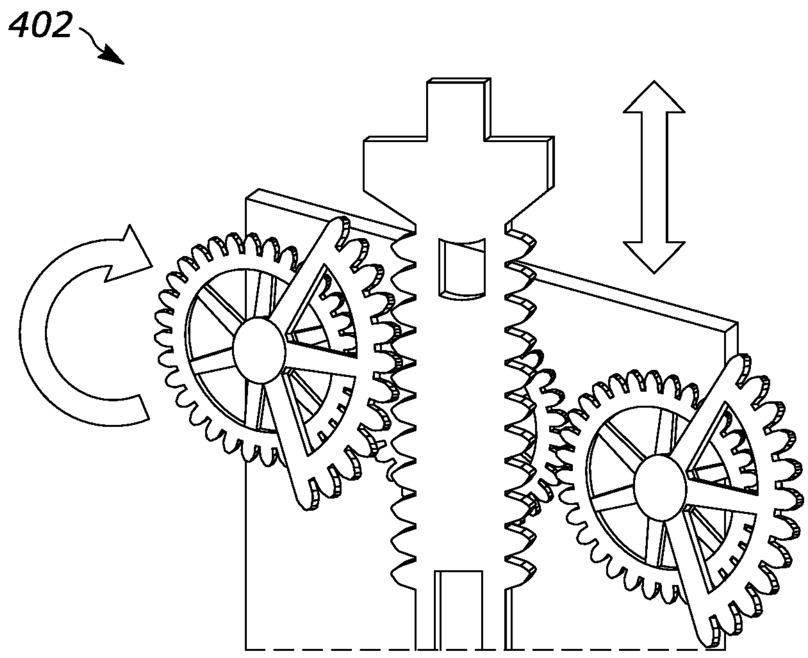
Figure 10F:
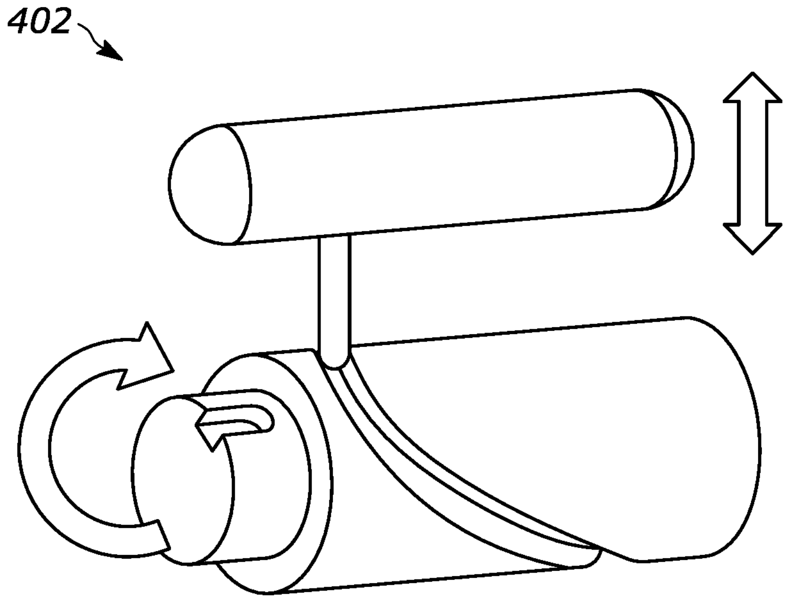
Figure 10G:
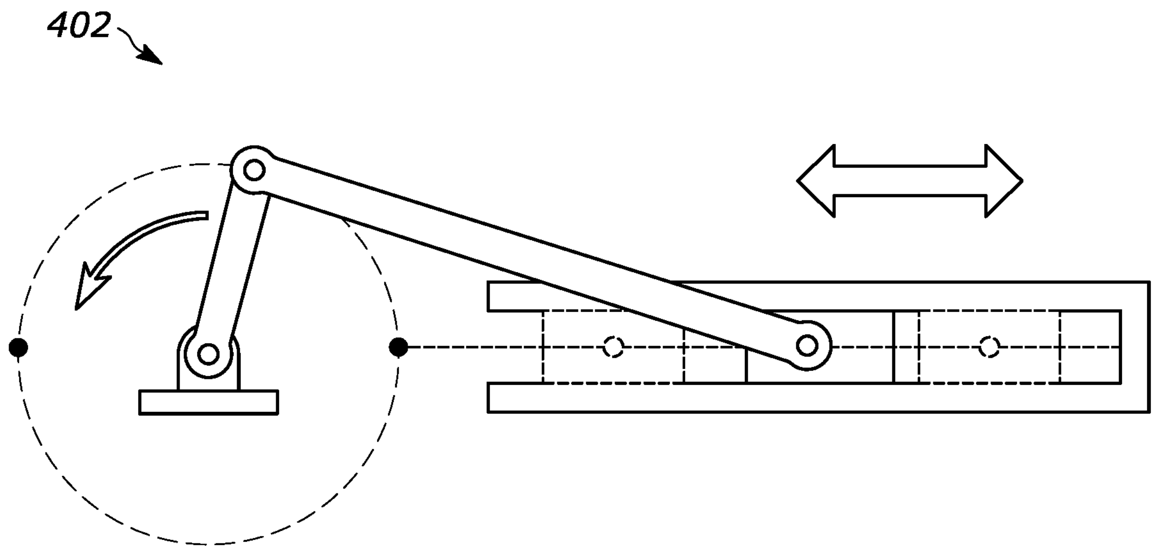

Referring back to FIGS. 4A and 4B, in some embodiments, the motor 408 may be a rotary motor, and the motion conversion mechanism 402 converts rotary motion into axial oscillation 304 (FIG. 3). When converting rotary motion to axial oscillation 304, motion conversion mechanism 402 may include at least one of an angle tooth cam mechanism, a slider crank, or a ratchet and pawl mechanism. Examples of rotary to angular oscillation motion conversion mechanisms are shown in FIGS. 10A-D. FIG. 10A illustrates an example of a pin in a curved slot mechanism. FIG. 10B illustrates an example of an angle tooth cam mechanism. FIG. 10C illustrates an example of a ratchet and pawl mechanism that is spring loaded. FIG. 10D illustrates an example of a crankshaft mechanism. FIG. 10E illustrates an example of a combination of two ratchet and pawl mechanisms. FIG. 10F illustrates an example of a cylindrical cam mechanism. FIG. 10G illustrates an example of a slider crank.

In addition to the motion conversion mechanisms illustrated in FIGS. 9A-10G, the motion conversion mechanism 402 may include one or more of an angle tooth cam mechanism, a slider crank, or a ratchet and pawl mechanism in some embodiments. The motion conversion mechanisms 402 shown in FIGS. 9A-10G are provided as examples only. Generally, variously configured motion conversion mechanisms 402 may be used with embodiments of the insertion tool 100 herein.

Referring back to FIGS. 4A and 4B, in some embodiments, the motor 408 may be an axial reciprocating mechanism such as a linear electric motor, a solenoid, a pneumatic shaker, an air hammer, a hydraulic shaker, a linear piezo motor, a linear resonant actuator (LRA), and/or a bi-stable actuator. In some embodiments, the motor 408 may be a servomotor that outputs angular oscillation 302 (FIG. 3). When the motor 408 outputs reciprocating motion 220 (FIG. 2), the motion conversion mechanism 402 may be integrated with the motor 408 and/or be omitted.

Figure 6:
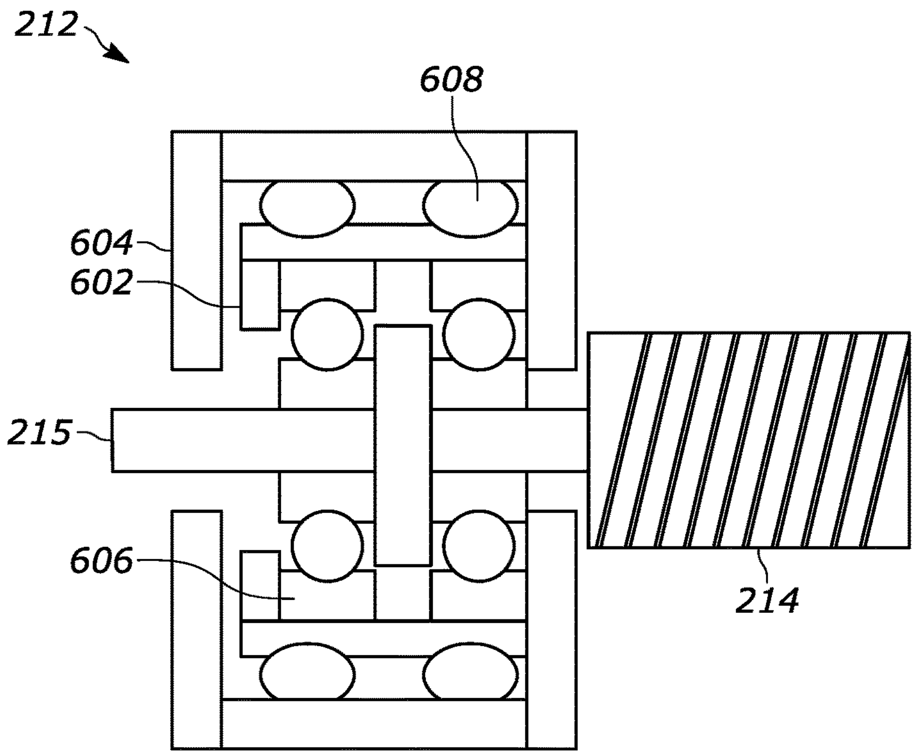
FIG. 6 is a vibration control mechanism in accordance with some embodiments of the present disclosure.

FIG. 6 is an illustration of a vibration control mechanism 212 for reducing the vibration of the insertion tool 100 in response to the reciprocation motion 220 (FIG. 2) of the end effector 214. In some embodiments, the vibration control mechanism 212 includes a mechanism housed within the distal end 216 (FIG. 2) of the flexible section 210 (FIG. 2) such as the tip link 604. In FIG. 6, the tip link 604 houses a bearing house 602, and a shaft 215 of the end effector 214 coupled to the tip link 604 via bearings 606 within bearing house 602. The vibration control mechanism 212 includes dampers 608 between the bearing housing 602 and the tip link 604 such that transmission of vibrations from the end effector 214 to the tip link 604 is reduced by the dampers 608. The dampers may be an O-ring, springs, or other force/motion dampening structures of material.

FIG. 6 is provided as an example vibration control mechanism 212 only. In some embodiments, the vibration control mechanism 212 includes one or more O-rings or friction joints between one or more rigidizable links 502 of flexible section 210. In some embodiments, the vibration control mechanism 212 further includes an active stabilizer coupled to a proximal end 218 of the insertion tool 100 that functions as a vibration control mechanism 212. The active stabilizer may include a multi-axis manipulator. In some embodiments, the vibration control mechanism 212 may be the tension assembly 208 (FIG. 1) of the flexible section 210 that increases or decreases tension in the flexible section 210 to affect the natural frequency of the insertion tool 100. In some embodiments the vibration control mechanism 212 may include active vibration control using flexible fluidic matrix composites to vary the stiffness of the flexible section 210.

Figure 7B:
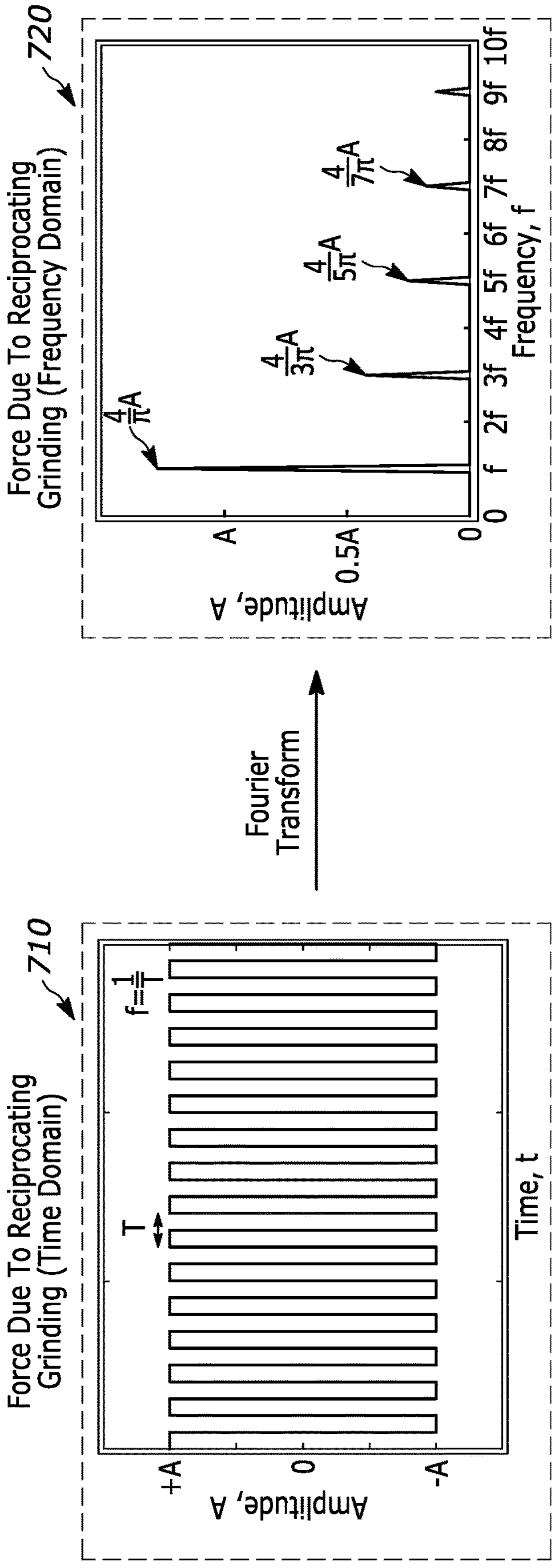
Figure 8:
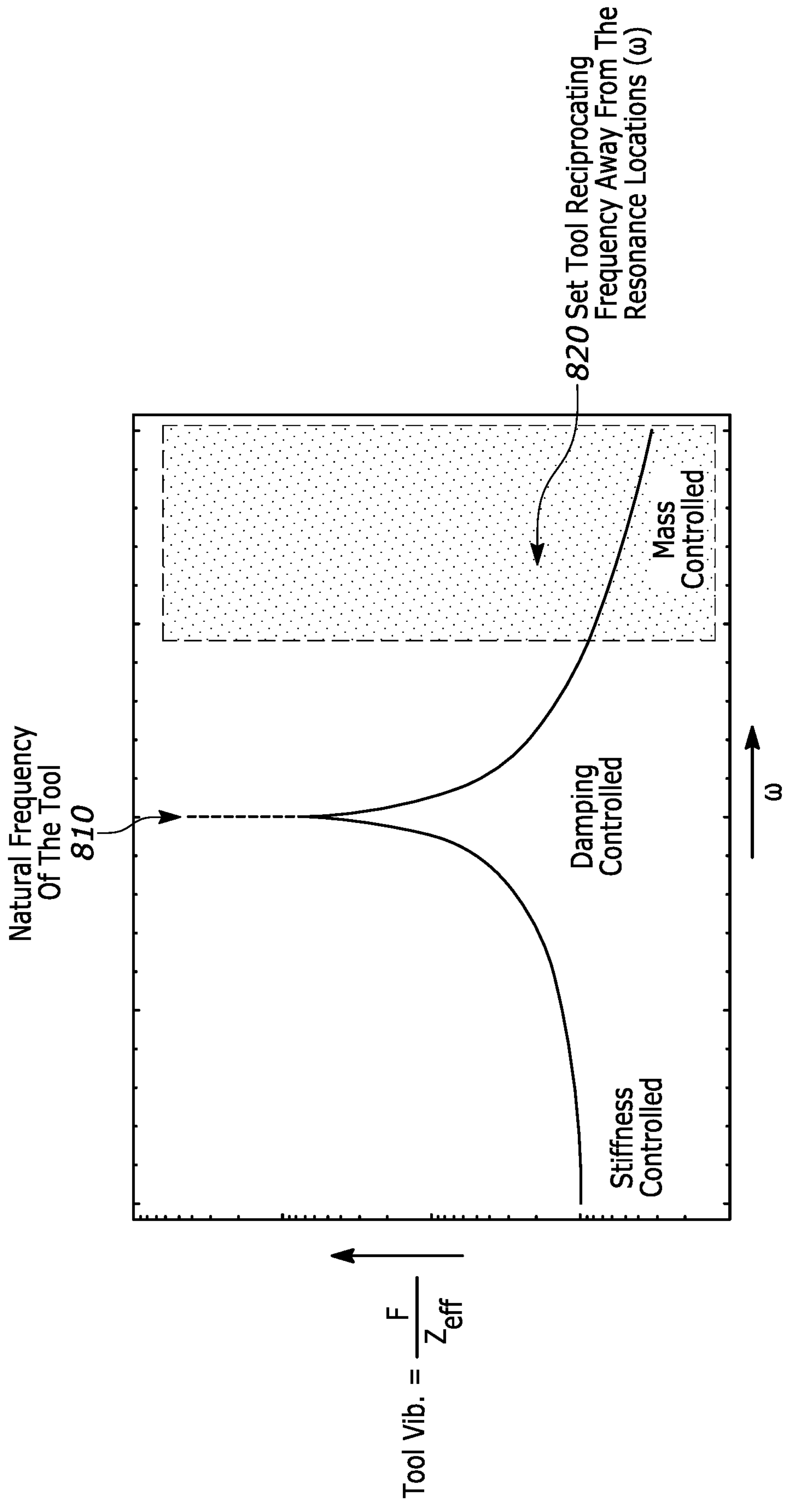
FIG. 8 is a graph depicting the tool vibration at different angular velocity values in accordance with some embodiments of the present disclosure.

Next referring to FIGS. 7A, 7B, and FIG. 8, factors and considerations for determining the reciprocating rate/frequency of the end effector are described. In FIG. 7A, equations for determining effective tool impedance ($Z_{eff}$) are shown. An equation for mechanical impedance may be expressed as $$Z = \frac{F}{v} = j\omega M + C - \frac{jK}{\omega},$$

wherein Z represents Impedance, F represents force, v presents velocity, ω represents angular velocity, M represents mass, and C presents damping, K represents stiffness, and i represents an imaginary unit. An equation for the effective tool impedance may be expressed as $$Z_{eff} = \sum_{i=1}^{N_{rope}} Z_{rope} + \frac{1}{\sum_{i=1}^{N_{cell}} \frac{1}{Z_{cell}} + f(Z_{rope})}.$$

Effective tool impedance $Z_{eff}$ being equal to the summation (the index of summation being i=1 and the last value of i being $N_{rope}$, which is the number of ropes in tension assembly 208 used to rigidize the tool 100) of rope impedance $Z_{rope}$, plus 1 divided by the summation (the index of summation being i=1 and the last value of i being $N_{cell}$) of 1 divided by cell impedance $Z_{cell}$, plus a function f of rope impedance $Z_{rope}$. The function f of rope impedance $Z_{rope}$ is representative of the cell assembly stiffness. The summation of 1 divided by $Z_{cell}$ is representative of the unit cells in series. All of the components after the first summation are representative of the ropes and unit cell assembly in parallel.

In FIG. 7B, the determination of force due to reciprocating grinding (F) is shown. Graph 710 depicts amplitude as a function of time. The bounds for the amplitude are from −A/2 to A/2. The amplitude oscillates in a square wave pattern, the period of the pattern being T, and the time from one square end to end being τ. Frequency f is a function of 1/T. Graph 720 depicts amplitude as a function of frequency, and is a Fourier transform of graph 710. The bounds for amplitude are from 0 to 1, and values of frequency increase with respect to f (i.e., 1f, 2f, 3f . . . ). The forces experienced by a reciprocating tool would be a square wave of a certain amplitude A (oscillating between +A and −A). The frequency content of such a signal would have only odd-integer harmonics of the base frequency (f=1/T). The frequencies and amplitudes of force due to reciprocating motion may be expressed with the following equations:

$$\text{Frequency of}(2k-1)^{th}\text{ harmonic: } \frac{(2k-1)}{T} = (2k-1)f$$

$$\text{Amplitude of}(2k-1)^{th}\text{ harmonic: } \frac{4}{\pi(2k-1)}$$

As discussed in further detail below with reference to FIG. 8, the frequency f (=1/T) of reciprocating motion may be placed in the mass-controlled region to avoid resonance.

FIG. 8 is a graph illustration of expected tool vibration magnitude as a function of end effector reciprocation rate according to some embodiments. The x-axis is a function of tool reciprocation rate and the y-axis is the amplitude of tool vibration which is equal to $$\frac{F}{Z_{eff}}.$$

Where $Z_{eff}$ is the effective tool impedance determined based on the equation described in FIG. 7A, and F is the force due to reciprocating motion 220 of the vibration control mechanism 212 described with reference to FIG. 7B. The peak 810 in the graph corresponds to the natural frequency of the insertion tool 100. When the tool reciprocation rate is substantially less (e.g., 10%, 20%, or 30% less) than the natural frequency, tool vibration may be limited through stiffness control of the tool. When the expected vibration frequency is near the natural frequency (e.g., within 5%, 10%, 15%), tool vibration may be damping controlled, for example by the damping control mechanism 212. When the tool reciprocation rate is substantially more (e.g., 10%, 20%, or 30% more) than the natural frequency, the vibration is massed controlled. In some embodiments, the tool 100 may be operated at a frequency in the mass-controlled range 820 to avoid resonance with the natural frequency of the tool and limit the amplitude of the tool vibration. In some embodiments, when a tool 100 is configured to operate in the mass-controlled range 820, the vibration control mechanism 212 may be omitted or turned off. In some embodiments, when the end effector is actuated to oscillate, the magnitude of oscillation of the flexible section of the tool is less than 50% of the magnitude of the end effector either through selecting a reciprocating rate in the mass-controlled range 820 and/or through a vibration control mechanism 212. In some embodiments, the mass-controlled range 820 for an insertion tool 100 may be determined based on the structure of the insertion tool 100 based on the process above. The end effector actuator 202 may then be selected/configured to drive the end effector 214 to the reciprocate at a rate of within the mass-controlled range 820. In some embodiments, the end effector actuator 202 may have variable speed, and the speed of the 202 may be set by a control circuit or manually to drive the end effector 214 to the reciprocate at a rate of within the mass-controlled range 820.

Figure 11:
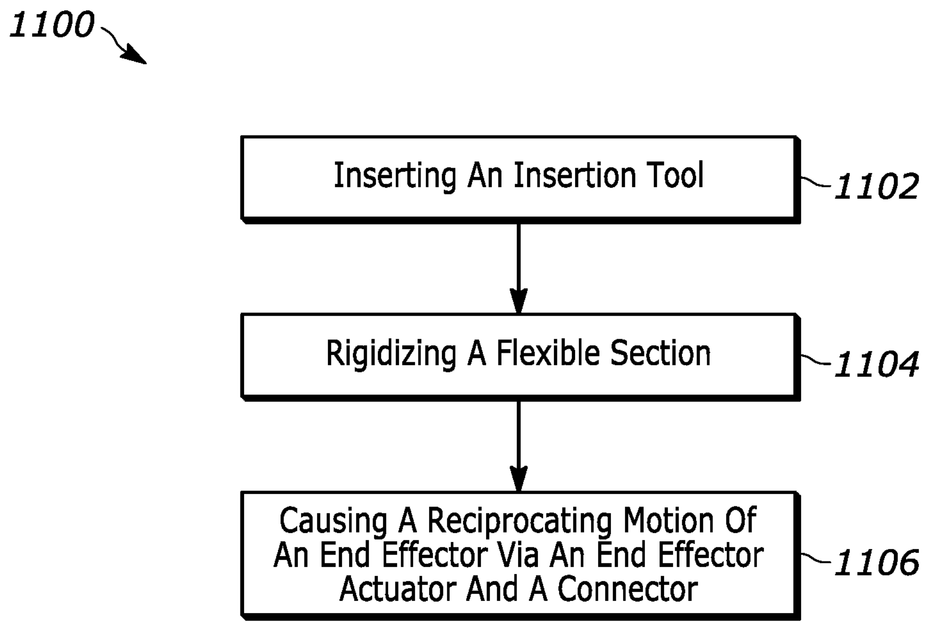
FIG. 11 is a flow chart depicting a method of operating an insertion tool in accordance with some embodiments of the present disclosure.

FIG. 11 is a flow diagram 1100 of a method for serving an assembled engine 10. In some embodiments, one or more steps of FIG. 11 may be performed by an operator using the insertion tool 100 (FIG. 2) or a processor-based controller 250 sending control signals to the end effector actuator 202 and/or the rigidization actuator 204 of the insertion tool 100 shown in FIG. 2.

In step 1102, the insertion tool 100 is inserted into a tool path of a device. For example, the insertion tool 100 may be inserted into a port of an assembled engine 10 (FIG. 1). The insertion tool 100 may be the insertion tool 100 described with reference to FIG. 2, including the flexible section 210, the end effector actuator 202, the connector 206 within flexible section 210 and coupled to end effector actuator 202, and the end effector 214 coupled to a distal end 216 of the flexible section 210.

In step 1104, the flexible section 210 is rigidized. In some embodiments, the flexible section may be rigidized via the rigidization actuator 204 described with reference to FIGS. 2 and 5. Upon rigidization, the flexible section 210 may take a predefined shape to position the end effector 214 at a select position relative to a workpiece within the confined space.

For example, the end effector 214 may be positioned against a specific component (e.g., blade, vane) within a turbine engine.

In step 1106, a reciprocating motion 220 of the end effector 214 is driven by an effector actuator 202 via the connector 206 to service a workpiece within the assembled engine 10. The end effector actuator 202 may be driven at a select reciprocation rate determined according to the process described with reference to FIGS. 7A, 7B, and 8.

After step 1106, the tool 100 may be relaxed or un-rigidized and removed from the tool path.

With the systems and methods described herein, a reciprocating motion insertion tool is provided that can reduce the misalignment of the tool during operation by reducing the tangential friction force of conventional boreblending tools. Selecting a reciprocating rate away from the natural frequency of the tool further reduces excessive vibration of the tool during operation.

Further aspects of the disclosure are provided by the subject matter of the following clauses:

A method for serving an assembled engine, including: inserting an insertion tool including: a flexible section; an end effector actuator; a connector within the flexible section and coupled to the end effector actuator; and an end effector coupled to a distal end of the flexible section; rigidizing the flexible section; and causing, via the end effector actuator and the connector, a reciprocating motion of the end effector actuator at a select reciprocation rate to service a workpiece within the assembled engine.

An insertion tool includes a flexible section; an end effector actuator; a connector within the flexible section and coupled to the end effector actuator; and an end effector coupled to a distal end of the flexible section, wherein the end effector is configured to move in a reciprocating motion at a select reciprocation rate when driven by the end effector actuator.

The insertion tool of any preceding clause, wherein the reciprocating motion includes angular oscillation around an axis of the end effector.

The insertion tool of any preceding clause, wherein the end effector actuator includes a servomotor.

The insertion tool of any preceding clause, wherein the end effector actuator includes a rotary motion motor, and the insertion tool further includes a motion conversion mechanism that converts rotary motion to angular oscillation motion.

The insertion tool of any preceding clause, wherein the rotary motion motor includes an electrical motor, an air motor, a vane motor, a piston motor, a hydraulic motor, a gear pump, a twin-screw pump, or a rotary piezo motor.

The insertion tool of any preceding clause, wherein the motion conversion mechanism includes one or more of a four-bar linkage mechanism, a six-bar linkage mechanism, a crank-rocker mechanism, or a pin in a curved slot mechanism.

The insertion tool of any preceding clause, wherein the reciprocating motion includes axial oscillation along an axis of the end effector.

The insertion tool of any preceding clause, wherein the end effector actuator is an axial reciprocating actuator.

The insertion tool of any preceding clause, wherein the axial reciprocating actuator includes one or more of a linear electric motor, a solenoid, a pneumatic shaker, air hammer, a hydraulic shaker, a linear piezo motor, a linear resonant actuator (LRA), or a bi-stable actuator.

The insertion tool of any preceding clause, wherein the end effector actuator is a rotation motion actuator including a rotary motion motor and a motion conversion mechanism for converting rotary motion to axial oscillation motion.

The insertion tool of any preceding clause, wherein the rotary motion motor includes an electrical motor, an air motor, a vane motor, a piston motor, a hydraulic motor, a gear pump, a twin-screw pump, or a rotary piezo motor.

The insertion tool of any preceding clause, wherein the motion conversion mechanism includes one or more of an angle tooth cam mechanism, a slider crank, or a ratchet and pawl mechanism.

The insertion tool of any preceding clause, wherein the reciprocating motion includes angular oscillation and axial oscillation.

The insertion tool of any preceding clause, wherein the connector is configured to supply electrical, mechanical, pneumatic, or hydraulic power to the end effector actuator positioned within the flexible section or at the distal end of the flexible section.

The insertion tool of any preceding clause, wherein the connector is connected between the end effector actuator and the end effector and is configured to transmit motion from the end effector actuator to the end effector.

The insertion tool of any preceding clause, wherein the connector includes a flexible cable, a flexible drive shaft, an electrical wire, or a fluid tube.

The insertion tool of any preceding clause, wherein the connector transmits motion from a motion conversion mechanism to the end effector.

The insertion tool of any preceding clause, wherein the connector transmits motion from the end effector actuator to a motion conversion mechanism.

The insertion tool of any preceding clause, wherein the reciprocating motion has a range of motion between 5 microns to 13 millimeters.

The insertion tool of any preceding clause, wherein the select reciprocation rate is between 10-10,000 Hertz.

The insertion tool of any preceding clause, further including a vibration control mechanism configured to reduce the vibration of the insertion tool in response to the reciprocating motion of the end effector.

The insertion tool of any preceding clause, wherein the vibration control mechanism includes dampers between a bearing housing at the distal end of the flexible section and a shaft of the end effector.

The insertion tool of any preceding clause, wherein the vibration control mechanism includes one or more O-rings or friction joints between links of the flexible section.

The insertion tool of any preceding clause, wherein the vibration control mechanism includes an active stabilizer coupled to a proximal end of the insertion tool.

The insertion tool of any preceding clause, wherein the active stabilizer includes a multi-axis manipulator.

The insertion tool of any preceding clause, wherein the vibration control mechanism includes a flexible fluid matric composition configured to selectively rigidize the flexible section.

The insertion tool of any preceding clause, wherein the vibration control mechanism includes a tension assembly configured to change the natural frequency of the flexible section via a tension applied to the flexible section.

The insertion tool of any preceding clause, wherein the select reciprocation rate is determined based on selecting a rate at least 10% greater than the natural frequency of the insertion tool.

The insertion tool of any preceding clause, wherein the magnitude of oscillation of the flexible section of the tool is less than 50% of the magnitude of the end effector when the end effector is actuated to oscillate.

The insertion tool of any preceding clause, wherein the end effector includes one or more of a grinding burr, a grinding disc, a grinding wheel, a grinding stone, a saw, a sanding bit, a filing bit, a buffing wheel, a lapping tool, and a needle peening tool.

The insertion tool of any preceding clause, wherein the flexible section includes a plurality of rigidizable links that are selectively rigidizable by a tension assembly between a relaxed state and a tensioned state.

The insertion tool of any preceding clause, wherein the flexible section includes a rigidizable section that can be selectively rigidized with a rigidization actuator via a jamming mechanism, a layer jamming mechanism, electromagnetic stiffness tuning of magnetorheological materials or electro-rheological fluids, stiffness modulation with phase change, or stiffness modulation with pressurization.

The insertion tool of any preceding clause, wherein the flexible section includes a rigidizable guide tube or a snake arm robot.

An insertion tool includes an insertion portion; a telescoping link, the telescoping link having a base part and an extension part, the extension part being configured to slide longitudinally relative to the base part from a retracted state to an extended state; a joint actuation assembly configured to change an angle between the base part of the telescoping link and the insertion portion via a joint; and an extension actuator configured to actuate the extension part of the telescoping link from the retracted state to the extended state.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An insertion tool comprising:

a flexible section;

an end effector actuator;

a connector within the flexible section and coupled to the end effector actuator; and an end effector coupled to a distal end of the flexible section, wherein the end effector is configured to move in a reciprocating motion at a select reciprocation rate when driven by the end effector actuator, wherein the reciprocating motion comprises angular oscillation around an axis of the end effector.

2. The insertion tool of claim 1, wherein the end effector actuator comprises a rotary motion motor, and the insertion tool further comprises a motion conversion mechanism that converts rotary motion to angular oscillation motion.

3. An insertion tool comprising:

a flexible section;

an end effector actuator;

a connector within the flexible section and coupled to the end effector actuator; and an end effector coupled to a distal end of the flexible section, wherein the end effector is configured to move in a reciprocating motion at a select reciprocation rate when driven by the end effector actuator;

wherein the reciprocating motion comprises axial oscillation along an axis of the end effector.

4. The insertion tool of claim 3, wherein the end effector actuator is an axial reciprocating actuator.

5. The insertion tool of claim 3, wherein the end effector actuator is a rotation motion actuator comprising a rotary motion motor and a motion conversion mechanism for converting rotary motion to axial oscillation motion.

6. The insertion tool of claim 1, wherein the connector is configured to supply electrical, mechanical, pneumatic, or hydraulic power to the end effector actuator positioned within the flexible section or at the distal end of the flexible section.

7. The insertion tool of claim 1, wherein the connector is connected between the end effector actuator and the end effector and is configured to transmit motion from the end effector actuator to the end effector.

8. The insertion tool of claim 1, wherein the connector comprises a flexible cable, a flexible drive shaft, an electrical wire, or a fluid tube.

9. The insertion tool of claim 1, wherein the connector transmits motion from a motion conversion mechanism to the end effector.

10. An insertion tool comprising:

a flexible section;

an end effector actuator;

a connector within the flexible section and coupled to the end effector actuator; and an end effector coupled to a distal end of the flexible section, wherein the end effector is configured to move in a reciprocating motion at a select reciprocation rate when driven by the end effector actuator, wherein the select reciprocation rate is between 10-10,000 Hertz.

11. An insertion tool comprising:

a flexible section;

an end effector actuator;

a connector within the flexible section and coupled to the end effector actuator;

an end effector coupled to a distal end of the flexible section, wherein the end effector is configured to move in a reciprocating motion at a select reciprocation rate when driven by the end effector actuator; and a vibration control mechanism configured to reduce vibration of the insertion tool in response to the reciprocating motion of the end effector.

12. The insertion tool of claim 11, wherein the vibration control mechanism comprises a tension assembly configured to change a natural frequency of the flexible section via a tension applied to the flexible section.

13. An insertion tool comprising:

a flexible section;

an end effector actuator;

a connector within the flexible section and coupled to the end effector actuator; and an end effector coupled to a distal end of the flexible section, wherein the end effector is configured to move in a reciprocating motion at a select reciprocation rate when driven by the end effector actuator, wherein the select reciprocation rate is determined based on selecting a rate at least 10% greater than a natural frequency of the insertion tool.

14. An insertion tool comprising:

a flexible section;

an end effector actuator;

a connector within the flexible section and coupled to the end effector actuator; and an end effector coupled to a distal end of the flexible section, wherein the end effector is configured to move in a reciprocating motion at a select reciprocation rate when driven by the end effector actuator, wherein a magnitude of oscillation of the flexible section of the tool is less than 50% of a magnitude of the end effector when the end effector is actuated to oscillate.

15. The insertion tool of claim 1, wherein the end effector comprises one or more of a grinding burr, a grinding disc, a grinding wheel, a grinding stone, a saw, a sanding bit, a filing bit, a buffing wheel, a lapping tool, and a needle peening tool.

16. The insertion tool of claim 1, wherein the flexible section comprises a plurality of rigidizable links that are selectively rigidizable by a tension assembly between a relaxed state and a tensioned state.

17. The insertion tool of claim 1, wherein the flexible section comprises a rigidizable section that can be selectively rigidized with a rigidization actuator via a jamming mechanism, a layer jamming mechanism, electromagnetic stiffness tuning of magnetorheological materials or electrorheological fluids, stiffness modulation with phase change, or stiffness modulation with pressurization.

18. The insertion tool of claim 1, wherein the flexible section comprises a rigidizable guide tube or a snake arm robot.

19. A method for servicing an assembled engine, comprising:

inserting an insertion tool comprising:

a flexible section;

an end effector actuator;

a connector within the flexible section and coupled to the end effector actuator; and an end effector coupled to a distal end of the flexible section;

rigidizing the flexible section; and causing, via the end effector actuator and the connector, a reciprocating motion of the end effector actuator at a select reciprocation rate to service a workpiece within the assembled engine, wherein the reciprocating motion comprises angular oscillation around an axis of the end effector.

* * * * *